(12) United States Patent
Albano et al.

(10) Patent No.: US 6,822,050 B2
(45) Date of Patent: Nov. 23, 2004

(54) FLUOROELASTOMERIC COMPOSITIONS

(75) Inventors: Margherita Albano, Milan (IT); Marco Apostolo, Novara (IT); Stefano Arrigoni, Novara (IT)

(73) Assignee: Ausimont S.p.A., Milan (IT)

( * ) Notice: Subject to any disclaimer, the term of this patent is extended or adjusted under 35 U.S.C. 154(b) by 118 days.

(21) Appl. No.: 10/151,953

(22) Filed: May 22, 2002

(65) Prior Publication Data

US 2003/0040581 A1 Feb. 27, 2003

(30) Foreign Application Priority Data

May 22, 2001 (IT) .................................. MI2001A1059

(51) Int. Cl.[7] .......................... C08L 27/00; C08L 27/12
(52) U.S. Cl. ...................................... 525/199; 524/520
(58) Field of Search ........................ 525/199; 524/520

(56) References Cited

U.S. PATENT DOCUMENTS

| | | | |
|---|---|---|---|
| 3,752,787 A | 8/1973 | De Brunner | |
| 3,875,654 A | 4/1975 | Pattison | 260/30.4 |
| 4,035,565 A | 7/1977 | Apotheker et al. | 526/249 |
| 4,233,427 A | 11/1980 | Bargain et al. | 525/478 |
| 4,243,770 A | 1/1981 | Tatemoto et al. | 525/331 |
| 4,259,463 A | 3/1981 | Moggi et al. | 525/331 |
| 4,564,662 A | 1/1986 | Albin | 528/247 |
| 4,694,045 A | 9/1987 | Moore | 525/276 |
| 4,745,165 A | 5/1988 | Arcella et al. | 526/247 |
| 4,789,717 A | 12/1988 | Giannetti et al. | 526/209 |
| 4,864,006 A | 9/1989 | Giannetti et al. | 526/209 |
| 4,943,622 A | 7/1990 | Naraki et al. | 526/206 |
| 5,173,553 A | 12/1992 | Albano et al. | 526/238 |
| 5,523,346 A | 6/1996 | Wu | 524/805 |
| 5,616,648 A | 4/1997 | Wu | 524/805 |
| 5,625,019 A | 4/1997 | Arcella et al. | 526/247 |
| 6,310,142 B1 * | 10/2001 | Apostolo et al. | 525/200 |
| 6,395,834 B1 * | 5/2002 | Albano et al. | 525/199 |

FOREIGN PATENT DOCUMENTS

| | | |
|---|---|---|
| EP | 0 120 462 A1 | 3/1984 |
| EP | 0 136 596 A2 | 10/1985 |
| EP | 0 182 299 A2 | 5/1986 |
| EP | 0 199 138 A2 | 10/1986 |
| EP | 0 335 705 A1 | 4/1989 |
| EP | 0 410 351 A1 | 1/1991 |
| EP | 0 684 277 A1 | 11/1995 |
| EP | 0 769 520 A1 | 4/1997 |
| EP | 0 661 304 B1 | 10/1997 |
| EP | 0 708 797 | 4/1998 |
| EP | 0 668 436 A1 | 8/1998 |
| EP | 0 959 027 A1 | 1/2000 |
| EP | 0 979 832 A1 | 2/2000 |
| EP | 1 029 875 A1 | 8/2000 |
| EP | 1 031 606 A1 | 8/2000 |
| EP | 1 031 607 A1 | 8/2000 |
| WO | WO 97/05122 | 2/1997 |
| WO | WO 00/04091 | 1/2000 |

* cited by examiner

*Primary Examiner*—Nathan M. Nutter
(74) *Attorney, Agent, or Firm*—Arent Fox Kintner; Arnet Fox PLLC

(57) ABSTRACT

Fluoroelastomeric compositions comprising:
  A) a fluoroelastomeric matrix based on vinylidene fluoride (VDF);
  B) a semi-crystalline fluoropolymer, in an amount from >40% to 90% by weight based on the total of A)+B), comprising a semi-crystalline fluoropolymer core coated by a semi-crystalline fluoropolymer shell containing bromine and/or iodine in the polymer chain;
the fluoroelastomer A) incorporates the fluoropolymer B), the fluoropolymer B) being formed by tetrafluoroethylene (TFE) homopolymers, or by TFE copolymers with one or more monomers containing at least one unsaturation of ethylene type, the average sizes of the semi-crystalline fluoropolymer particles being from 10 to 100 nm, preferably from 10 to 60 nm.

20 Claims, No Drawings

FLUOROELASTOMERIC COMPOSITIONS

The present invention relates to fluoroelastomeric compositions consisting essentially of a VDF-based fluoroelastomer and a semi-crystalline fluoropolymer, having improved chemical and thermal resistance, high hardness and lower fluid permeability, in particular hydrocarbons, combined with good mechanical properties and usable in the preparation of sealing manufactured articles, in particular for the oil industry.

Specifically, the present invention relates to fluoroelastomeric compositions comprising a VDF-based fluoroelastomeric matrix which incorporates semi-crystalline fluoropolymer particles, wherein the semi-crystalline fluoropolymer is coated by a semi-crystalline fluoropolymer shell containing bromine and/or iodine in the polymer chain, said compositions characterized by improved mechanical properties combined with high hardness and improved surface aspect, free of roughnesses. Said combination of properties makes available fluoroelastomers usable in the oil drilling field, wherein the fluoroelastomer manufactured articles must resist to high pressure variations.

It is known to increase the fluoroelastomer hardness in the oil drilling field, high amounts of filler, such as carbon black, in an amount of the order of 40–60 phr, are to be added. In this way higher hardnesses are obtained, but the mechanical properties, in particular the elastic modulus/elongation at break ratio result clearly worsened, wherefore the so obtained manufactured article is more easily lacerable (lower elasticity).

By trying to replace the carbon black filler with a semi-crystalline fluoropolymer, for example polytetrafluoroethylene (PTFE) powder, there are many difficulties in its incorporation, without the possibility to prepare a homogeneous blend between the semi-crystalline fluoropolymer and yhe fluoroelastomer, in particular when the semi-crytalline fluoropolymer amount is high. Generally, to obtain a satisfactory homogeneization of the semi-crystalline fluoropolymer in the fluoroelastomer, it is necessary to use complicated technologies, using open mixers with complicated incorporation cycles, for example by heating the rolls and using several steps. Even operating with these extremely complicated technologies, the incorporation of the semi-crystalline fluoropolymer in the fluoroelastomer is not uniform and the manufactured article shows poor mechanical properties (in particular the modulus/elongation ratio) and poor reproducibility of the results, whereby there is poor reliability of the preparation process and a high number of pieces to be discarded. Besides, the final manufactured article is not homogeneous due to the poor disperdibility of the semi-crystalline fluoropolymer and therefore the hardness, even though it has an average value suitable to said applications, changes from point to point whereby the properties of the finished manufactured article are poor as above indicated and are not suitable for the use in the oil field, in particular in the oil drilling.

From the European patent application EP 1,031,606 it is known to incorporate under the latex form a semi-crystalline fluoropolymer containing iodine and/or bromine atoms, in a fluoroelastomer to improve the mechanical properties with respect to a fluoroelastomer filled with PTFE powder. The particles of the semi-crystalline fluoropolymer latex have sizes comprised between 10 and 100 nm. In said patent application it is stated that the use of a semi-crystalline fluoropolymer latex containing iodine and/or bromine allows to improve the mechanical properties with respect to the case of absence of iodine and/or bromine. In the Examples the introduction of iodine atoms by using iodinated transfer agents is reported. However, for oil drilling applications, the required hardness values of the manufactured article and the mechanical properties are not suitable. In said patent application it is stated that iodine and/or bromine deriving from comonomers in the preparation of the semi-crystalline fluoropolymer can be used. The comonomer content in the final product results lower than 2 moles per 100 moles of the other monomeric units of the semi-crystalline fluoropolymer. No Examples of compositions containing semi-crystalline fluoropolymers containing iodinated and/or brominated comonomers are reported. Tests carried out by the Applicant have shown that even operating in above way no fluoroelastomeric compositions suitable for oil drilling applications are obtained. See the comparative Examples.

The need was felt to have available fluoroelastomeric compositions having the following combination of peroperties:

improved mechanical properties, in particular improved elastic modulus/elongation at break ratio;

high hardness, homogeneous on the whole manufactured article and suitable for oil drilling applications;

improved chemical and thermal resistance;

excellent surface aspect, roughnesses free;

working easiness in equipments conventionally used in the fluoroelastomer field, without using complicated technologies for incorporation of fluoropolymer.

It would be desirable to have also said fluoroelastomeric compositions showing a lower permeability to fluids, in particular to hydrocarbons.

The Applicant has unexpectedly and surprisingly found that it is possible to obtain the combination of the above properties by using the specific compositions defined hereunder.

An object of the present invention are therefore fluoroelastomeric compositions comprising:

A) a fluoroelastomeric matrix based on vinylidene fluoride (VDF);

B) a semi-crystalline fluoropolymer, in an amount from >40% to 90% by weight based on the total of A)+B), comprising a semi-crystalline fluoropolymer core coated by a semi-crystalline fluoropolymer shell containing bromine and/or iodine in the polymer chain, the amount of brominated and/or iodinated comonomer being from >2% to 10% by moles per 100 moles of the other basic monomeric units of the semi-crystalline fluoropolymer B) core+shell;

the fluoroelastomer A) incorporates the fluoropolymer B), the fluoropolymer B) being formed by tetrafluoroethylene (TFE) homopolymers, or TFE by copolymers with one or more monomers containing at least one unsaturation of ethylene type, in an amount from 0.01% to 10% by moles, preferably from 0.05% to 7% by moles; the core and the shell of the fluoropolymer B) can be of a different composition between each other, the average sizes of the semi-crystalline fluoropolymer B) particles being from 10 to 100 nm, preferably from 10 to 60 nm.

The fluoroelastomeric compositions of the invention are obtainable by mixing the latex of the semi-crystalline fluoropolymer B) with the latex of the fluoroelastomer A) and subsequent coagulation.

Alternatively to the latex mixing, the fluoroelastomeric compositions of the invention can be obtained in the same reactor, using two subsequent steps: in the first step the semi-crystalline fluoropolymer B) having the above nanometric sizes is polymerized, while in the second step the fluoroelastomer A) is polymerized. By operating in this way the fluoroelastomer A) covers the latex particles of semi-crystalline fluoropolymer B) allowing to obtain a very good disperdibility of the latter in the fluoroelastomer.

The semi-crystalline fluoropolymer B) amount incorporated in the fluoroelastomeric matrix is higher than 40% by weight, preferably from >40% to 80% by weight based on the total of the polymer mixture, more preferably from 45 to 70% by weight.

The semi-crystalline fluoropolymer B) particles having the above nanometric sizes are obtainable for example by polymerization in aqueous microemulsion of perfluoropolyoxy-alkylenes as described for example in European patent application 969,027 in the name of the Applicant, herein incorporated by reference. Polymerization techniques in microemulsion wherein the oil phase is formed by polymerizable unsaturated monomers can also be used, as described in U.S. Pat. Nos. 5,523,346 and 5,616,648.

The Applicant has found that in order to obtain the results of the invention it is essential that the semi-crystalline fluoropolymer B) has the mentioned nanometric sizes, while the size of the fluoroelastomer A) particles to be mixed with the fluoropolymer is not critical.

The semi-crystalline fluoropolymers of the present invention comprise a semi-crystalline fluoropolymer core shelled by a semi-crystalline fluoropolymer containing in the polymer chain bromine and/or iodine atoms. The introduction of said bromine and/or iodine atoms can be carried out by addition in the polymerization mixture of the (co)monomers forming the fluoropolymer B), brominated and/or iodinated comonomers, such as bromo- and/or iodo-olefins having from 2 to 10 carbon atoms, as described for example in U.S. Pat. Nos. 4,035,565 and 4,694,045, 5,625,019, or bromo and/or iodo fluoroalkylvinylethers, as described in U.S. Pat. Nos. 4,745,165, 4,564,662 and EP 199,138, in such amounts whereby the content of brominated and/or iodinated comonomers in the final polymer B) is generally from >2 to 10% by moles per 100 moles of the other ba- sic monomeric units as above said, preferably from 2.5 to 6%.

Optionally, in combination with said comonomers, it is possible to introduce bromine and/or iodine end atoms by addition to the reaction mixture of brominated and/or iodinated chain transfer agents, such as for example described in U.S. Pat. Nos. 4,243,770 and 4,943,622, 5,173,553.

It has been unexpectedly found by the Applicant, see the comparative Examples, that the combination of properties of the invention compositions is obtainable only if the semi-crystalline fluoropolymer B) is present in amounts higher than 40% by weight with respect to the composition A)+B) and the fluoropolymer B) is prepared by using on the fluoropolymer shell a brominated and/or iodinated comonomer in an amount higher than 2% by moles with respect to the other basic monomeric units as above said. Tests carried out by the Applicant have shown that by operating under the conditions reported in the Examples of European patent application 1,031,606, wherein the semi-crystalline fluoropolymer does not contain bromine and/or iodine in the polymer chain and is present in amounts lower than 40% by weight, the combination of the above properties is not obtained.

By semi-crystalline fluoropolymer, a fluoropolymer is meant, which shows, besides the glass transition temperature Tg, at least one melting temperature.

The preparation of the fluoroelastomers A) of the composition of the present invention can be carried out by copolymerization of the monomers in aqueous emulsion, according to known methods of the prior art, in the presence of radical initiators, such as for example alkaline or ammonium persulphates, perphosphates, perborates or percarbonates, optionally in combination with ferrous, cuprous or silver salts, or of other easily oxidizable metals. In the reaction medium also surfactants of various types are usually present, among which fluorinated surfactants are particularly preferred.

The polymerization reaction is generally carried out at temperatures in the range 25°–150° C., under a pressure up to 10 MPa.

The preparation of the fluoroelastomeric matrix is preferably carried out in microemulsion of (per) fluoropolyoxyalkylenes, according to U.S. Pat. Nos. 4,789, 717 and 4,864,006.

When the semi-crystalline fluoropolymer B) present in the fluoroelastomeric compositions of the invention is based on modified PTFE, i.e. it contains at least one comonomer, for its preparation comonomers having an ethylene unsaturation both of hydrogenated and fluorinated type can be used. Among the hydrogenated ones, ethylene, propylene, acrylic monomers, for example methylmethacrylate, (meth)acrylic acid, butylacrylate, hydroxyethylhexylacrylate, styrene monomers can be mentioned.

Among the fluorinated comonomers it can be mentioned:

$C_3$–$C_8$ perfluoroolefins, such as hexafluoropropene (HFP), hexafluoroisobutene;

$C_2$–$C_8$ hydrogenated fluoroolefins, such as vinyl fluoride (VF), vinylidene fluoride (VDF), trifluoroethylene, perfluoroalkylethylene $CH_2=CH-R_f$, wherein $R_f$ is a $C_1$–$C_6$ perfluoroalkyl;

$C_2$–$C_8$ chloro-fluoroolefins, such as chlorotrifluoroethylene (CTFE);

(per)fluoroalkylvinylethers (PAVE) $CF_2=CFOR_f$, wherein $R_f$ is a $C_1$–$C_6$ (per)fluoroalkyl, for example $CF_3$, $C_2F_5$, $C_3F_7$;

(per)fluoro-oxyalkylvinylethers $CF_2=CFOX$, wherein X is: a $C_1$–$C_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl; fluorodioxoles, preferably perfluorodioxoles;

fluorovinylethers (MOVE) of general formula $CFX_{AI}=CX_{AI}OCF_2OR_{AI}$ (A-I) wherein $R_{AI}$ is a $C_2$–$C_6$ linear, branched or $C_5$–$C_6$ cyclic (per)fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H; the com-pounds of general formula $CFX_{AI}=CX_{AI}OCF_2OCF_2CF_2Y_{AI}$ (A-II) wherein $Y_{AI}$=F, $OCF_3$; $X_{AI}$ as above are preferred; in particular (MOVE I) $CF_2=CFOCF_2OCF_2CF_3$ (A-III) and (MOVE II) $CF_2=CFOCF_2OCF_2CF_2OCF_3$ (A-IV) are preferred.

PAVEs, in particular perfluoromethyl-, ethyl-, propylvinylether, MOVEs, in particular MOVE I and MOVE II, and fluorodioxoles, preferably perfluorodioxoles, are preferred comonomers.

The fluoroelastomers A) used in the present invention are VDF-based copolymers, wherein VDF is copolymerized with at least a comonomer selected from the following:

$C_2$–$C_8$ perfluoroolefins, such as tetrafluoroethylene (TFE), hexafluoropropene (HFP);

$C_2$–$C_8$ chloro- and/or bromo- and/or iodo-fluoroolefins, such as chlorotrifluoroethylene (CTFE) and bromotrifluoroethylene;

(per)fluoroalkylvinylethers (PAVE) $CF_2=CFOR_f$, wherein $R_f$ is a $C_1$–$C_6$ (per)fluoroalkyl, for example trifluoromethyl, bromodifluoromethyl, pentafluoropropyl;

perfluoro-oxyalkylvinylethers $CF_2=CFOX$, wherein X is a $C_1$–$C_{12}$ perfluorooxyalkyl, having one or more ether groups, for example perfluoro-2-propoxy-propyl;

fluorovinylethers (MOVE) of general formula $CFX_{AI}=CX_{AI}OCF_2OR_{AI}$ (A-I) wherein $R_{AI}$ is a $C_2$–$C_6$ linear, branched or $C_5$–$C_6$ cyclic (per) fluoroalkyl group, or a $C_2$–$C_6$ linear, branched (per)fluorooxyalkyl group containing from one to three oxygen atoms; when $R_{AI}$ is a fluoroalkyl or a fluorooxyalkyl group as above it can contain from 1 to 2 atoms, equal or different, selected from the following: H, Cl, Br, I; $X_{AI}=F$, H; the compounds of general formula: $CFX_{AI}=CX_{AI}OCF_2OCF_2CF_2Y_{AI}$ (A-II) wherein $Y_{AI}=F$, $OCF_3$; $X_{AI}$ as above are preferred; in particular (MOVE I) $CF_2=CFOCF_2OCF_2CF_3$ (A-III) and (MOVE II) $CF_2=CFOCF_2OCF_2CF_2OCF_3$ (A-IV) are preferred;

$C_2$–$C_8$ fluorinated olefins (Ol), for example ethylene and propylene.

Preferred compositions, in % by moles, of the mixtures of the monomers which form the basic structure of the fluoroelastomer, are the following, being 100% the sum of the molar percentages of the monomers:

(a) vinylidene fluoride (VDF) 45–85%, hexafluoropropene (HFP) 15–45%, tetrafluoroethylene (TFE) 0–30%; $C_2$–$C_8$ non fluorinated olefins (Ol) 0–30%;

(b) vinylidene fluoride (VDF) 45–85%, perfluoroalkylvinylether (PAVE) and/or fluorovinylethers (MOVE) 15–55%, tetrafluorethylene (TFE) 0–30%;

(c) vinilydene fluoride (VDF) 15–40%, $C_2$–$C_8$ non fluorinated olefins (Ol) 5–30%, hexafluoropropene (HFP) and/or perfluoroalkylvinylether (PAVE) 15–30%, tetrafluoroethylene (TFE) 10–30%;

(d) vinylidene fluoride (VDF) 5–30%, perfluoroalkylvinylether (PAVE) and/or fluorovinylethers (MOVE) 15–55%, tetrafluoroethylene (TFE) 33–75%;

(e) vinylidene fluoride (VDF) 5–30%, tetrafluoroethylene (TFE) 45–65%, $C_2$–$C_8$ non fluorinated olefins (Ol) 20–55%.

Optionally the fluoroelastomeric matrix comprises also monomeric units deriving from a bis-olefin having general formula:

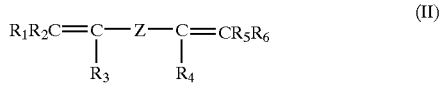

(II)

wherein:

$R_1$, $R_2$, $R_3$, $R_4$, $R_5$, $R_6$, equal to or different from each other, are H or $C_1$–$C_5$ alkyls;

Z is a $C_1$–$C_{18}$ linear or branched alkylene or cycloalkylene radical, optionally containing oxygen atoms, preferably at least partially fluorinated, or a (per) fluoropolyoxyalkylene radical, as described in EP 661,304 in the name of the Applicant.

The amount of units in the polymer chain deriving from said bis-olefins is generally in the range 0.01–1.0% by moles, preferably 0.03–0.5% by moles, still more preferably 0.05–0.2% by moles per 100 moles on the total of the other above mentioned monomeric units which form the basic structure of the fluoroelastomer.

The compositions of the present invention can be cured by peroxidic or ionic route or by the combination of the two techniques. For crosslinking by peroxidic or mixed route, the fluoroelastomers A) contain in the polymer chain and/or in terminal position of the macromolecules iodine and/or bromine atoms. The introduction in the fluoroelastomeric matrix of said iodine and/or bromine atoms can be obtained by addition of brominated and/or iodinated "cure-site" comonomers, such as bromo and/or iodo olefins having from 2 to 10 carbon atoms, as described for example in U.S. Pat. Nos. 4,035,565 and 4,694,045, or of iodo and/or bromo fluoroalkylvinylethers, as described in U.S. Pat. Nos. 4,745,165, 4,564,662 and EP 199,138, in such amounts that the cure-site comonomer content in the final product is generally in the range 0.05–4 moles per 100 moles of the other basic monomeric units.

Other usable iodinated compounds are the triiodinated ones derived from triazines as described in European patent application EP 860,436 and in European patent application 979,832.

In alternative or also in combination with the "cure-site" comonomers, it is possible to introduce in the fluoroelastomer iodine and/or bromine end atoms by addition to the reaction mixture of iodinated and/or brominated chain transfer agents, such as for example the compounds of formula $R_f(I)_x(Br)_y$, wherein $R_f$ is a (per)fluoroalkyl or a (per)fluorochloroalkyl having from 1 to 8 carbon atoms, while x and y are integers comprised between 0 and 2, with $1 \leq x+y \leq 2$ (see for example U.S. Pat. Nos. 4,243,770 and 4,943,622). It is also possible to use as polymer chain transfer agents iodides and/or bromides of alkaline or alkaline-earth metals, according to U.S. Pat. No. 5,173,553.

In combination with the chain polymer transfer agents containing iodine and/or bromine, other polymer chain transfer agents known in the prior art, such as ethyl acetate, diethylmalonate, etc., can be used.

Curing by peroxidic route is carried out, according to known techniques, by addition of a suitable peroxide capable to generate radicals by thermal decomposition. Among the most commonly used we remember: dialkyl peroxides, such as for example di-terbutyl-peroxide and 2,5-dimethyl-2,5-di(terbutylperoxy)hexane; dicumyl peroxide; dibenzoyl peroxide; diterbutyl perbenzoate; di[1,3-dimethyl-3-(terbutylperoxy)butyl]carbonate. Other peroxidic systems are described, for example, in European patent applications EP 136,596 and EP 410,351.

To the curing blend other compounds are then added, such as:

(a) curing coagents, in amounts generally in the range 0.5–10%, preferably 1–7% by weight with respect to the polymer; among them there are usually used: triallylcyanurate; triallyl-isocyanurate (TAIC); tris(diallylamine)-s-triazine; triallylphosphite; N,N-diallylacrylamide; N,N,N',N'-tetraallyl-malonamide; trivinylisocyanurate; 2,4,6-trivinyl-methyltrisiloxane, etc.; TAIC is particularly preferred; other preferred crosslinking agents are the bis-olefins described in EP 769,520. Other crosslinking agents which can be used are triazines described in European patent application EP 860,436 and in European patent application WO97/05122;

(b) optionally a metal compound, in amounts in the range 1–15%, preferably 2–10%, by weight with respect to the polymer, selected from oxides or hydroxides of divalent metals, such as for example Mg, Zn, Ca or Pb, optionally combined with a weak acid salt, such as for example stearates, benzoates, carbonates, oxalates or phosphites of Ba, Na, K, Pb, Ca;

(c) optionally acid acceptors of the non metal oxide type such as 1,8 bis dimethyl amino naphthalene, octadecylamine, etc. as described in EP 708,797.

(d) other conventional additives, such as thickening fillers, pigments, antioxidants, stabilizers and the like.

Curing by ionic route is carried out by addition of curing and accelerating agents well known in the prior art. The amounts of the accelerating agents are in the range 0.05–5 phr, the curing agent in the range 0.5–15 phr, preferably 1–6 phr.

As curing agents, aromatic or aliphatic polyhydroxylated compounds or their derivatives can be used, as described for example in EP 335,705 and U.S. Pat. No. 4,233,427. Among them we remember in particular: di-, tri- and tetra-hydroxy benzenes, naphthalenes or anthracenes; bisphenols, wherein the two aromatic rings are linked each other by an aliphatic, cycloaliphatic or aromatic bivalent radical, or by one oxygen or sulphur atom, or also by a carbonyl group. Aromatic rings can be substituted by one or more chlorine, fluorine, bromine atoms or by carbonyls, alkyls, acyls. In particular bisphenol AF is preferred.

As accelerating agents it can be used for example: quaternary ammonium or phosphonium salts (see for example EP 335,705 and U.S. Pat. No. 3,876,654); aminophosphonium salts (see for example U.S. Pat. No. 4,259,463); phosphoranes (see for example U.S. Pat. No. 3,752,787); iminic compounds described in EP 182,299 and EP 120,462; etc. Quaternary phosphonium salts and aminophosphonium salts are preferred.

Instead of using the accelerating agent and the curing agent separately, it can also be used from 1 to 5 phr (preferred from 2 to 4.5) of an adduct between an accelerating agent and a curing agent in molar ratio from 1:2 to 1:5, preferably from 1:3 to 1:5, the accelerating agent being one of the onium-organic compounds having a positive charge, as above defined, the curing agent being selected from the above compounds, in particular di- or polyhydroxy or di- or polythiol compounds; the adduct being obtained by melting the reaction product between the accelerating agent and the curing agent in the mentioned molar ratios, or by melting the mixture of the adduct 1:1 added with the curing agent in the indicated amounts. Optionally also an excess of the accelerating agent with respect to that contained in the adduct can be present, generally in amounts from 0.05 to 0.5 phr.

For the preparation of the adduct, particularly preferred as cations are: 1,1-diphenyl-1-benzyl-N-diethyl-phosphoranamine and tetrabutyl phosphonium; among the anions bisphenol compounds are particularly preferred wherein the two aromatic rings are linked by a bivalent radical selected from the perfluoroalkyl groups having from 3 to 7 carbon atoms, and the OH are in para position.

The adduct preparation is described in European patent application in the name of the Applicant EP 684,277 herein incorporated by reference.

The curable blend furthermore contains:
i) one or more inorganic acid acceptors selected from those known in ionic curing of vinylidene fluoride copolymers, in amounts 1–40 parts for 100 parts of fluoroelastomeric copolymer;
   ii) one or more basic compounds selected from those known in the ionic curing of vinylidene fluoride copolymers in amounts from 0.5 to 10 parts per 100 parts of fluoroelastomeric copolymer.

The basic compounds ii) are commonly selected in the group formed from $Ca(OH)_2$, $Sr(OH)_2$, $Ba(OH)_2$, metal salts of weak acids, such as for example carbonates, benzoates, oxalates and phosphites of Ca, Sr, Ba, Na and K and mixtures of the aforesaid hydroxides with the aforesaid metal salts; among the compounds of the type i), MgO can be mentioned.

The indicated amounts of the blend components are referred to 100 phr of copolymer or terpolymer of the invention. To the curing blend other conventional additives, such as thickeners, pigments, antioxidants, stabilizers and the like can then be added.

As said, the fluoroelastomeric compositions of the invention show the following combination of properties:

improved mechanical properties, in particular improved elastic modulus/elongation at break ratio;

high hardness, preferably higher than 90 Shore A, homogeneous on the whole manufactured article and suitable to prepare gaskets for oil drilling applications;

improved chemical and thermal resistance;

very good surface aspect, lacking of roughnesses;

working easiness in equipments conventionally used in the fluoroelastomer field, without using complicated technologies for the incorporation;

lower permeability to fluids, in particular to hydrocarbons.

This combination of properties makes the fluoroelastomeric compositions of the invention particularly suitable in the oil drilling sector.

The present invention will be better illustrated by the following Examples, which have a merely indicative and not limitative purpose of the scope of the invention itself.

EXAMPLES

Example 1

Preparation of the Invention Composition Containing 50% of Semi-crystalline Fluoropolymer B) Having a Brominated Comonomer Content Equal to 2.5% by Moles of Comonomer Based on the Total of the Monomeric Units of the Fluoropolymer B)

a) Preparation of the Semi-crystalline Fluoropolymer B) Latex

In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

56.4 ml of a perfluoropolyoxyalkylene having an acid end group of formula:
$CF_2ClO$ $(CF_2—CF(CF_3)O)_n(CF_2O)_mCF_2COOH$
wherein n/m=10, having average molecular weight of 600;

56.4 ml of an aqueous solution of $NH_4OH$ at 30% by volume;

112.8 ml of demineralized water;

34.4 ml of Galden® having the formula:
$CF_3O(CF_2—CF$ $(CF_3)O)_n(CF_2O)_mCF_3$
wherein n/m=20, having average molecular weight of 450.

The autoclave was then heated up to 80° C. and maintained at this temperature for the whole reaction. The autoclave was brought to the pressure of 0.6 bar (0.06 MPa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator. Starting from 75% of the monomer conversion, 150 g (equivalent to 2.5% by moles with respect to the other monomeric units of the fluoropolymer B)) of bromoethylheptafluorovinylether (BVE) $CF_2=CF-OCF_2CF_2Br$ are fed in five steps, for every 5% increase of the monomer conversion.

During the reaction the pressure is maintained at 20 bar by continuously feeding the following monomeric mixture: 2% by moles of PMVE and 98% of TFE.

After 160 minutes of reaction, corresponding to 100% of the monomer conversion, the autoclave was cooled and the latex discharged. The latex properties are reported in Table 1.

b) Preparation of the Fluoroelastomer A) Latex

In a 10 l autoclave, equipped with stirrer working at 545 rpm, there were introduced, after evacuation, 6.5 l of demineralized water and 67 ml of a microemulsion of perfluoropolyoxyalkylenes previously obtained by mixing:

14.5 ml of a perfluoropolyoxyalkylene having an acid end group of formula:
$CF_2ClO (CF_2-CF(CF_3)O)_n(CF_2O)_mCF_2COOH$
wherein n/m=10, having average molecular weight of 600;

14.5 ml of an aqueous solution of $NH_4OH$ at 30% by volume;

29 ml of demineralized water;

9 ml of Galden® D02 having the formula:
$CF_3O(CF_2-CF(CF_3)O)_n(CF_2O)_mCF_3$
wherein n/m=20, having average molecular weight of 450.

The autoclave was then heated up to 80° C. and maintained at said temperature for the whole reaction. The following mixture of monomers was then fed:

| | |
|---|---|
| vinilydene fluoride (VDF) | 48% by moles |
| hexafluoropropene (HFP) | 45% by moles |
| tetrafluoroethylene (TFE) | 7% by moles | so as to bring the pressure up to 30 bar (3 MPa).

In the autoclave there were then introduced:

0.32 g of ammonium persulphate (APS) as initiator;

21 g of 1,6-diiodoperfluorobutane ($C_4F_8I_2$) as polymer chain transfer agent; the addition was carried out in 3 aliquots, the first equal to 3.2 g at the beginning of the polymerization, the second one equal to 9.4 g at 20% of conversion, the third one equal to 8.4 g at 80% of conversion;

10 g of bis-olefin of formula $CH_2=CH-(CF_2)_6-CH=CH_2$; the addition was carried out in 20 aliquots, each of 0.5 g starting from the beginning of the polymerization and for every 5% increase in the monomer conversion.

The 30 bar pressure was maintained constant for the whole polymerization by feeding a mixture formed by:

| | |
|---|---|
| vinilydene fluoride (VDF) | 70% by moles |
| hexafluoropropene (HFP) | 19% by moles |
| tetrafluoroethylene (TFE) | 11% by moles |

After 160 minutes of reaction, corresponding to 100% of the monomer conversion, the autoclave was cooled and the latex discharged. The latex properties are reported in Table 1.

c) Mixing of the Latexes and Preparation of the Invention Composition

The latex obtained in a) was mixed with the latex prepared in b) so as to obtain an amount of semi-crystalline polymer equal to 50% by weight with respect to the total weight of A)+B). After mixing the latex is coagulated with a solution of aluminum sulphate (6 g of $Al_2(SO_4)_3$ for each liter of latex) and dried at 90° C. in an air circulating oven for 16 hours. 1,000 g of the invention composition were obtained, which was characterized for the mechanical properties in Table 2.

The mixing of the composition of Example 1 with the crosslinking agents was carried out in an open mixer commonly used to mix fluoroelastomers. The plates obtained by moulding of the composition of Example 1 show a very smooth surface, roughnesses free.

Example 2

Preparation of the Invention Composition Containing 50% of Semi-crystalline Fluoropolymer B) Having a Brominated Comonomer Content Equal to 5% by Moles of Comonomer Based on the Total of the Monomeric Units of the Fluoropolymer B)

a) Preparation of the Semi-crystalline Fluoropolymer B) Latex

Example 1 is repeated but using an amount of bromovinyl-ether in the preparation of the fluoropolymer B) equal to 300 g.

b) Preparation of the Fluoroelastomer A) Latex

The procedure of Example 1 is repeated.

c) Mixing of the Latexes and Preparation of the Invention Composition

The procedure described in Example 1 is repeated, obtaining 1,000 g of polymer.

The latex properties are reported in Table 1. The characterization of the invention composition (mechanical properties) is reported in Table 2.

The mixing of the composition of Example 2 with the crosslinking agents was carried out in an open mixer commonly used to mix fluoroelastomers. The plates obtained by moulding of the composition of Example 2 show a very smooth surface, roughnesses free.

Example 3

Preparation of the Invention Composition Containing 70% of Semi-crystalline Fluoropolymer B) Having a Brominated Comonomer Content Equal to 2.5% by Moles of Comonomer Based on the Total of the Monomeric Units of the Fluoropolymer B)

a) Preparation of the Semi-crystalline Fluoropolymer B) Latex

Example 1 is repeated.

b) Preparation of the Fluoroelastomer A) Latex

The procedure of Example 1 is repeated.

c) Mixing of the Latexes and Preparation of the Invention Composition

The latex obtained in a) was mixed with the latex prepared in b) so as to obtain an amount of semi-crystalline polymer equal to 70% by weight with respect to the total weight of A)+B). After mixing the latex is coagulated with a solution of aluminum sulphate (6 g of $Al_2(SO_4)_3$ for each liter of latex) and dried at 90° C. in an air circulating oven for 16 hours.

1,000 g of polymer are obtained.

The latex properties are reported in Table 1. The characterization of the invention composition (mechanical properties) is reported in Table 3.

The mixing of the composition of Example 3 with the crosslinking agents was carried out in an open mixer commonly used to mix fluoroelastomers. The plates obtained by moulding of the composition of Example 3 show a very smooth surface, roughnesses free.

Example 4

Comparative

Preparation of a Composition Containing 50% of Semi-crystalline Fluoropolymer B) Not Containing Bromine a) Preparation of the Semi-crystalline Fluoropolymer B) Latex In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

- 56.4 ml of a perfluoropolyoxyalkylene having an acid end group of formula:
  $CF_2ClO\ (CF_2—CF(CF_3)O)_n(CF_2O)_mCF_2COOH$
  wherein n/m=10, having average molecular weight of 600;
- 56.4 ml of an aqueous solution of $NH_4OH$ at 30% by volume;
- 112.8 ml of demineralized water;
- 34.4 ml of Galden® D02 having the formula:
  $CF_3O(CF_2—CF(CF_3)O)_n(CF_2O)_mCF_3$
  wherein n/m=20, having average molecular weight of 450.

The autoclave was then heated up to 80° C. and maintained at this temperature for the whole reaction. The autoclave was brought to the pressure of 0.6 bar (60 Kpa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator.

During the reaction the pressure is maintained at 20 bar by continuously feeding the following monomeric mixture: 2% by moles of PMVE and 98% of TFE.

After 45 minutes of reaction, the autoclave was cooled and the latex discharged. The latex properties are reported in Table 1.

b) Preparation of the Fluoroelastomer A) Latex

The procedure of Example 1 is repeated.

c) Mixing of the Latexes and Preparation of the Final Composition

The procedure of Example 1 is repeated, obtaining 1,000 g of polymer.

The latex properties are reported in Table 1. The mechanical properties of the polymer are reported in Table 2.

Example 4a

Comparative

Preparation of a Composition Containing 50% of Semi-crystalline Fluoropolymer B) Obtained in the Presence of an Iodinated Transfer Agent a) Preparation of the Semi-crystalline Fluoropolymer B) Latex Example 1 was repeated but using instead of bromovinyl-ether an amount equal to 3 g of iodinated transfer agent $C_6F_{12}I_2$.

b) Preparation of the Fluoroelastomer A) Latex

The procedure of Example 1 is repeated.

c) Mixing of the Latexes and Preparation of the Final Composition

The procedure of Example 1 is repeated, obtaining 1,000 g of polymer.

The latex properties are reported in Table 1. The polymer mechanical properties are reported in Table 2.

Example 5

Comparative

Preparation of a Composition Containing 50% of Semi-crystalline Fluoropolymer B) Having a Brominated Comonomer Content Equal to 1.2% by Moles of Comonomer Based on the Total of the Monomeric Units of the Fluoropolymer B)

a) Preparation of the Semi-crystalline Fluoropolymer B) Latex

Example 1 is repeated but using an amount of bromovinyl-ether in the preparation of the fluoropolymer B) equal to 75 g.

b) Preparation of the Fluoroelastomer A) Latex

The procedure of Example 1 is repeated.

c) Mixing of the Latexes and Preparation of the Final Composition

The procedure described in Example 1 is repeated, obtaining 1,000 g of polymer.

The latex properties are reported in Table 1. The characterization of the invention composition (mechanical properties) is reported in Table 2.

Example 5a

Comparative

Preparation of a Composition Containing 40% of Semi-crystalline Fluoropolymer B) Having a Brominated Comonomer Content Equal to 1.2% by Moles of Comonomer Based on the Total of the Monomeric Units of the Fluoropolymer B)

a) Preparation of the Semi-crystalline Fluoropolymer B) Latex

Example 1 is repeated, but using an amount of bromovinyl-ether in the preparation of the fluoropolymer B) equal to 75 g.

b) Preparation of the Fluoroelastomer A) Latex

The procedure of Example 1 is repeated.

c) Mixing of the Latexes and Preparation of the Final Composition

The latex obtained in a) was mixed with the latex prepared in b) so as to obtain an amount of semi-crystalline polymer equal to 40% by weight with respect to the total weight of A)+B). After mixing one proceeds as described in Example 1, finally obtaining 1,000 g of polymer.

The latex properties are reported in Table 1. The characterization of the invention composition (mechanical properties) is reported in Table 2.

Example 5b

Comparative

Preparation of a Composition Containing 40% of Semi-crystalline Fluoropolymer B) Having a Brominated Comonomer Content Equal to 2.5% by Moles of Comonomer Based on the Total of the Monomeric Units of the Fluoropolymer B)

a) Preparation of the Semi-crystalline Fluoropolymer B) Latex

The procedure described in Example 1 is repeated.

b) Preparation of the Fluoroelastomer A) Latex

The procedure of Example 1 is repeated.

c) Mixing of the Latexes and Preparation of the Final Composition

The procedure described in Example 5a is repeated, finally obtaining 1,000 g of polymer.

The latex properties are reported in Table 1. The characterization of the invention composition (mechanical properties) is reported in Table 2.

Example 6

Preparation of a Composition of the Invention Containing 50% of Semi-crystalline Fluoropolymer B) Having an Iodinated Comonomer Content Equal to 2.5% by Moles of Comonomer Based on the Total of the Monomeric Units of the Fluoropolymer B)

a) Preparation of the Semi-crystalline Fluoropolymer B) Latex

In a 10 l autoclave, equipped with stirrer working at 545 rpm there were introduced, after evacuation, 6.5 l of demineralized water and 260 ml of a microemulsion of perfluoropolyoxyalkylenes previously obtained by mixing:

- 56.4 ml of a perfluoropolyoxyalkylene having an acid end group of formula:
  $CF_2ClO(CF_2—CF(CF_3)O)_n(CF_2O)_mCF_2COOH$
  wherein n/m=10, having average molecular weight of 600;
- 56.4 ml of an aqueous solution of $NH_4OH$ at 306 by volume;
- 112.8 ml of demineralized water;
- 34.4 ml of Galden® D02 having the formula:
  $CF_3O(CF_2—CF(CF_3)O)_n(CF_2O)_mCF_3$
  wherein n/m=20, having average molecular weight of 450.

The autoclave was then heated up to 80° C. and maintained at this temperature for the whole reaction. The autoclave was brought to the pressure of 0.6 bar (0.06 MPa) with ethane and then up to the pressure of 20 bar (2 MPa) with a monomeric mixture formed by 6.5% by moles of perfluoromethylvinylether (PMVE) and 93.5% by moles of tetrafluoroethylene (TFE).

0.13 g of ammonium persulphate (APS) were then introduced into the autoclave as initiator. Starting from the 75% of the monomer conversion, 170 g (equivalent to 2.5% by moles with respect to the other monomeric units of the fluoropolymer B)) of an iodo-olefin of formula $CH_2=CH—(CF_2)_6I$ are fed in five steps, for every 5% increase of the monomer conversion.

During the reaction the pressure is maintained at 20 bar by continuously feeding the following monomeric mixture: 2% by moles of PMVE and 98% of TFE.

After 180 minutes of reaction, corresponding to 100% of the monomer conversion, the autoclave was cooled and the latex discharged. The latex properties are reported in Table 1.

b) Preparation of the Fluoroelastomer A) Latex

The procedure of Example 1 is repeated.

c) Mixing of the Latexes and Preparation of the Final Composition

The procedure described in Example 1 is repeated, finally obtaining 1,000 g of polymer.

The latex properties are reported in Table 1. The characterization of the invention composition (mechanical properties) is reported in Table 2.

The mixing of the composition of Example 6 with the crosslinking agents was carried out in an open mixer commonly used to mix fluoroelastomers. The plates obtained by moulding of the composition of Example 6 show a very smooth surface, roughnesses free.

TABLE 1

| Example | solid/latex (g/l) | Particle diameter (nm) | MFI[1] ASTM D 1238 | Mooney $(1 + 10)^{121° C.}$ ASTM D1646 |
|---|---|---|---|---|
| 1 | | | | |
| Fluoroel. A | 360 | 70 | — | 52 |
| Polymer B | 270 | 40 | 40 | — |
| 2 | | | | |
| Fluoroel. A | 360 | 70 | — | 52 |
| Polymer B | 270 | 40 | 100 | — |
| 3 | | | | |
| Fluoroel. A | 360 | 70 | — | 52 |
| Polymer B | 270 | 40 | 40 | — |
| 4 comp. | | | | |
| Fluoroel. A | 360 | 70 | — | 52 |
| Polymer B | 200 | 30 | 10 | — |
| 4a comp. | | | | |
| Fluoroel. A | 360 | 70 | — | 52 |
| Polymer B | 130 | 13 | 20 | — |
| 5 comp. | | | | |
| Fluoroel. A | 360 | 70 | — | 52 |
| Polymer B | 270 | 35 | 50 | — |
| 5a comp. | | | | |
| Fluoroel. A | 360 | 70 | — | 52 |
| Polymer B | 270 | 35 | 50 | — |
| 5b comp. | | | | |
| Fluoroel. A | 360 | 70 | — | 52 |
| Polymer B | 270 | 40 | 40 | — |
| 6 comp. | | | | |
| Fluoroel. A | 360 | 70 | — | 52 |
| Polymer B | 200 | 35 | 15 | — |

[1]MFI was measured at 372° C. with 2.16 Kg

TABLE 2

| EXAMPLES | | 1 | 2 | 4 Comp | 4a Comp | 5 Comp | 5a Comp | 5b Comp | 6 |
|---|---|---|---|---|---|---|---|---|---|
| % by weight polymer B) in A) + B) | | 50 | 50 | 50 | 50 | 50 | 40 | 40 | 50 |
| Formulation: | | | | | | | | | |
| Comp. A) + B) | phr | 100 | 100 | 100 | 100 | 100 | 100 | 100 | 100 |
| Drimix TAIC | " | 3 | 3 | 3 | 3 | 3 | 3 | 3 | 3 |
| Luperco 101 XL | " | 2 | 2 | 2 | 2 | 2 | 2 | 2 | 2 |
| CELITE 499 | " | 5 | 5 | 5 | 5 | 5 | 5 | 5 | 5 |
| Carbon Black | " | 1 | 1 | 1 | 1 | 1 | 1 | 1 | 1 |
| MDR (177° C., 12') (ASTM D6204-97): | | | | | | | | | |
| ML | Lbf. in. | 11 | 7.0 | 12 | 11 | 10 | 5.0 | 7 | 11 |
| MH | " | 48 | 58 | 41 | 39 | 46 | 32 | 48 | 57 |
| Ts2 | sec | 21 | 19 | 15 | 19 | 19 | 28 | 25 | 16 |
| T' 90 | " | 75 | 70 | 63 | 65 | 81 | 98 | 78 | 65 |
| Mechanical properties after post-cure at 230° C. for 1 + 4 h (ASTM D412-83) | | | | | | | | | |
| M100 | Mpa | 9.7 | 10.7 | 6.2 | 7.2 | 8.2 | 6.2 | 7.3 | 16.2 |
| Stress at break | " | 16 | 17.4 | 15 | 16 | 16 | 14.5 | 15.5 | 21 |
| Elong. at break | % | 300 | 290 | 312 | 300 | 332 | 420 | 390 | 194 |
| Shore A hardness | | 91 | 92 | 86 | 88 | 88 | 78 | 82 | 92 |
| Compression set 200° C. for 70 h | | | | | | | | | |
| O-ring (ASTM D 395) | % | 74 | 68 | 82 | 85 | 77 | 72 | 68 | 65 |

TABLE 3

| | | Ex. 3 |
|---|---|---|
| % by weight polymer B) in A) + B) | | 70 |
| Formulation: | | |
| Comp. A) + B) | phr | 100 |
| Drimix TAIC | " | 3 |
| Luperco 101 XL | " | 2 |
| CELITE 499 | " | 5 |
| Carbon Black | " | 1 |
| MDR (177° C., 12') (ASTM D6204-97) | | |
| ML | Lbf. in. | 27 |
| MH | " | 51.6 |
| Ts2 | sec | 21.0 |
| T' 90 | " | 62 |

What is claimed is:

1. Fluoroelastomeric compositions comprising:
   a) a fluoroelastomeric matrix based on vinylidene fluoride (VDF);
   b) a semi-crystalline fluoropolymer, in an amount from >40% to 90% by weight based on the total of A)+B), comprising a semi-crystalline fluoropolymer core coated by a semi-crystalline fluoropolymer shell containing bromine and/or iodine in the polymer chain, the amount of brominated and/or iodinated comonomer being from >2% to 10% by moles per 100 moles of the other basic monomeric units of the semi-crystalline fluoropolymer B) core+shell;
the fluoroelastomer A) incorporates the fluoropolymer B), the fluoropolymer B) being formed by tetrafluoroethylene (TEE) homopolymers, or by TFE copolymers with one or more monomers containing at least one unsaturation of ethylene type, in an amount from 0.01% to 10% by moles; the core and the shell of fluoropolymer B) can be different from each other, the average sizes of the semi-crystalline fluoropolymer particles being from 10 to 100 nm.

2. Fluoroelastomeric compositions according to claim 1, wherein the semi-crystalline fluoropolymer B) amount at the inside of the fluoroelastomeric matrix is >40% to 80% by weight based on the total of the polymer mixture.

3. Compositions according to claim 1, wherein the semi-crystalline fluoropolymer B) comprises comonomers having an ethylene unsaturation both of hydrogenated and fluorinated type.

4. Compositions according to claim 3, wherein the fluorinated comonomers are selected from the following:
   $C_3$–$C_8$ perfluoroolefins;
   $C_2$–$C_8$ hydrogenated fluoroolefins, wherein $R_f$ is a $C_1$–$C_6$ perfluoroalkyl;
   $C_2$–$C_8$ chloro-fluorolefin (per) fluoroalkylvinylethers (PAVE) $CF_2$=$CFOR_f$, wherein $R_f$ is a $C_1$–$C_6$ (per) fluoroalkyl;
   (per)fluoro-oxyalkylvinylethers $CF_2$=CFOX, wherein X is: $C_1$–$C_{12}$ alkyl, or $C_1$–$C_{12}$ oxyalkyl, or $C_1$–$C_{12}$ (per) fluoro-oxyalkyl having one or more ether groups;
   fluorovinylethers (MOVE) of general formula $CFX_{AI}$=$CX_{AI}OCF_2OR_{AI}$ (A-I) wherein $R_{AI}$ is a $C_2$–$C_6$ linear, branched or $C_5$–$C_6$ cyclic (per) fluoroalkyl group, or a $C_2$–$C_6$ linear, branched (per) fluoro-oxyalkyl group containing from one to three oxygen atoms; when $R_{AI}$ is a fluoroalkyl or a fluoro-oxyalkyl group as above defined it can contain from 1 to 2 atoms, equal or different, selected from the following: H, Cl, Br, I; $X_{AI}$=F, H; the compounds of general formula $CFX_{AI}$=$CX_{AI}OCF_2OCF_2CF_2Y_{AI}$ (A-II) wherein YAI=F, $OCF_3$.

5. Compositions according to claim 4, wherein the comonomers are selected among PAVEs, MOVEs, and fluorodioxoles.

6. Compositions according to claim 1, wherein the fluoroelastomers A) are VDF-based copolymers, wherein VDF is copolymerized with at least a comonomer selected from the following:

$C_2$–$C_8$ perfluoroolefins;

$C_2$–$C_8$ chloro- and/or bromo- and/or iodo-fluoroolefins;

(per) fluoroalkylvinylethers (PAVE) $CF_2$=$CFOR_f$, wherein $R_f$ is a $C_1$–$C_6$ (per) fluoroalkyl;

perfluoro-oxyalkylvinylethers $CF_2$=CFOX, wherein X is a $C_1$–$C_{12}$ perfluorooxyalkyl, having one or more ether groups;

fluorovinylethers (MOVE) of general formula $CFX_{AI}$=$CX_{AI}OCF_2OR_{AI}$ (A-I) wherein $R_{AI}$ is a $C_2$–$C_6$ linear, branched or $C_5$–$C_6$ cyclic (per) fluoroalkyl group, or a $C_2$–$C_6$ linear, branched (per) fluorooxyalkyl group containing from one to three oxygen atoms; when $R_{AI}$ is a fluoroalkyl or a fluorooxyalkyl group as above defined it can contain from 1 to 2 atoms, equal or different, selected from the following: H, Cl, Br, I; $X_{AI}$=F, H; the compounds of general formula: $CFX_{AI}$=$CX_{AI}OCF_2OCF_2CF_2Y_{AI}$ (A-II) wherein $Y_{AI}$=F, $OCF_3$;

$C_2$–$C_8$ non fluorinated olefins (Ol).

7. Fluoroelastomeric compositions according to claim 1, wherein the compositions of the monomer blends, expressed as % by moles, which form the basic structure of the fluoroelastomer, are the following, being 100% the sum of the molar percentages of the monomers:

(a) vinylidene fluoride (VDF) 45%–85%, hexafluoropropene (HEP) 15–45%, tetrafluoroethylene (TFE) 0–30%; $C_2$–$C_8$ non fluorinated olefins (Ol) 0–30%;

(b) vinylidene fluoride (VDF) 45%–85%, perfluoroalkylvinylether (PAVE) and/or fluorovinylethers (MOVE) 15–55%, tetrafluoroethylene (TFE) 0–30%;

(c) vinylidene fluoride (VDF) 15–40%, $C_2$–$C_8$ non fluorinated olefins (Ol) 5–30%, hexafluoropropene (HFP) and/or perfluoroalkylvinylether (PAVE) 15–30%, tetrafluoroethylene (TFE) 10–30%;

(d) vinylidene fluoride (VDF) 5–30%, perfluoroalkylvinylether (PAVE) and/or fluorovinylethers (MOVE) 15–55%, tetrafluoroethylene (TFE) 33–75%;

(e) vinylidene fluoride (VDF) 5–30%, tetrafluoroethylene (TFE) 45–65%, $C_2$–$C_8$ non fluorinated olefins (Ol) 20–55%.

8. Compositions according to claim 6, wherein the fluoroelastomeric matrix comprises monomeric units deriving from a bis-olefin having general formula:

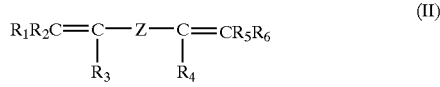

wherein:

$R_1$, $R_2$, $R_3$, $R_4$, $R_5$, $R_6$, equal to or different from each other, are H or $C_1$–$C_5$ alkyls;

Z is a $C_1$–$C_{18}$ linear or branched alkylene or cycloalkylene radical, optionally containing oxygen atoms or a (per) fluoropolyoxyalkylene radical, the amount of the units in the polymer chain deriving from said bis-olefins being in the range 0.01–1.0% by moles based on the total of the other monomeric units.

9. Fluoroelastomeric compositions according to claim 1, obtainable by mixing of the semi-crystalline fluoropolymer B) latex with the fluoroelastomer A) latex and subsequent coagulation.

10. Fluoroelastomeric compositions according to claim 1, obtainable in a same reactor, using two subsequent steps: in the first step the semi-crystalline fluoropolymer B) is polymerized, while in the second step the fluoroelastomer A) is polymerized.

11. Compositions according to claim 1, cured by peroxidic or ionic route or by the combination of the two techniques.

12. Process for sealing manufactured articles for oil drilling applications, comprising utilizing the compositions according to claim 10.

13. Fluoroelastomeric compositions according to claim 1, wherein said amount is from 0.05% to 7% by moles and/or the average sizes of the semi-crystalline fluoropolymer particles is from 10 to 60 nm.

14. Fluoroelastomeric compositions according to claim 2, wherein the semi-crystalline fluoropolymer B) amount at the inside of the fluoroelastomeric matrix is 45% to 70% by weight.

15. Fluoroelastomeric compositions according to claim 4, wherein:

said fluorinated comonomers are selected from hexafluoropropene (HFP), hexafluoroisobutene;

vinyl fluoride (VF), vinylidene fluoride (VDF), trifluoroethylene, or perfluoroalkylethylene $CH_2$=CH—$R_f$;

chlorotrifluoroethylene (CTFE);

(per) fluoroalkylvinylethers (PAVE) $CF_2$=$CFOR_f$, wherein $R_f$ is $CF_3$, $C_2F_5$, $C_3F_7$;

(per)fluoro-oxyalkylvinylethers $CF_2$=CFOX, wherein X is perfluoro-2-propoxy-propyl; fluorodioxoles; or fluorovinylethers (MOVE) of general formula $CFX_{AI}$=$CX_{AI}OCF_2OR_{AI}$ (A-I) wherein $R_{AI}$ is $X_{AI}$.

16. Fluoroelastomeric compositions according to claim 15, wherein:

said fluorinated comonomers are selected from perfluorodioxoles; or (MOVE I) $CF_2$=$CFOCF_2OCF_2CF_3$ (A-III), or (MOVE II) $CF_2CFOC$—$F_2OCF_2CF_2OCF$, (A-IV).

17. Fluoroelastomeric compositions according to claim 5, wherein said PAVES are-perfluoromethyl-, ethyl-, and propylvinylether, said MOVES are MOVE I and MOVE II, and/or said fluorodioxoles are perfluoro-dioxoles.

18. Fluoroelastomeric compositions according to claim 6, wherein:

said $C_2$–$C_8$ perfluoroolefins are tetrafluoroethylene (TFE) or hexafluoropropene (HFP);

said $C_2$–$C_8$ chloro- and/or bromo- and/or iodo-fluoroolefins are chlorotrifluoroethylene (CTFE) and bromotrifluoroethylene;

$R_f$ is trifluoromethyl, bromodifluoromethyl, and pentafluoropropyl;

in said perfluoro-oxyalkylvinylethers $CF_2$=CFOX, X is perfluoro-2-propoxy-propyl;

when $R_{AI}$ is a fluoroalkyl or a fluorooxyalkyl group it can contain from 1 to 2 atoms, equal or different, of $X_{AI}$=F, H, and/or (MOVE I) $CF_2$=$CFOCF_2OCF_2CF_3$ (A-III), or (MOVE II) $CF_2$=$CFOCF_2OCF_2CF_2OCF_3$ (A-IV); or $C_2$–$C_8$ non fluorinated olefins (Ol) are ethylene or propylene.

19. Fluoroelastomeric compositions according to claim 8, wherein Z is at least partially fluorinated, and/or for said (per) fluoropolyoxyalkylene radical, the amount of the units in the polymer chain deriving from said bis-olefins being in the range of 0.03–0.5% by moles per 100 moles, based on the total of the other monomer units.

20. Flouroelastomeric compositions according to claim 19, wherein for said (per) fluoropolyoxyalkylene radical, the amount of the units in the polymer chain deriving from said bis-olefins are in the range of 0.05–0.2% by moles per 100 moles based on the total of the other monomeric units.

* * * * *